United States Patent [19]
Kiridena et al.

[11] Patent Number: 5,442,572
[45] Date of Patent: Aug. 15, 1995

[54] METHOD AND SYSTEM FOR COMPARING FREE-FORM GEOMETRIES USING HIGH DENSITY POINT DATA MODELS

[75] Inventors: Vijitha Kiridena, Inkster; Samuel E. Ebenstein, Southfield; Gregory H. Smith, Ann Arbor, all of Mich.

[73] Assignee: Ford Motor Company, Dearborn, Mich.

[21] Appl. No.: 252,813

[22] Filed: Jun. 2, 1994

Related U.S. Application Data

[63] Continuation-in-part of Ser. No. 161,025, Dec. 3, 1993, Pat. No. 5,319,567, and Ser. No. 980,419, Nov. 23, 1992, Pat. No. 5,384,717.

[51] Int. Cl.$^6$ .............................................. G06K 9/32
[52] U.S. Cl. .................. 364/560; 364/474.24; 364/561; 382/141; 382/276; 356/1
[58] Field of Search ................ 364/474.22, 474.24, 364/474.34, 560–561, 562, 563; 382/8, 45; 356/1

[56] References Cited

U.S. PATENT DOCUMENTS

| | | | |
|---|---|---|---|
| 4,759,074 | 7/1988 | Iadipaolo et al. | 382/23 |
| 4,805,224 | 2/1989 | Koezuka et al. | 382/8 |
| 5,027,281 | 6/1991 | Rekow et al. | 364/474.24 |
| 5,121,333 | 6/1992 | Riley et al. | 364/474.05 |
| 5,121,334 | 6/1992 | Riley et al. | 364/474.05 |
| 5,128,870 | 7/1992 | Erdman et al. | 364/474.05 |
| 5,184,306 | 2/1993 | Erdman et al. | 364/474.05 |
| 5,257,203 | 10/1993 | Riley et al. | 364/474.05 |
| 5,295,200 | 3/1994 | Boyer | 382/45 |
| 5,307,421 | 4/1994 | Darboux et al. | 382/8 |

*Primary Examiner*—Emanuel T. Voeltz
*Assistant Examiner*—Craig Steven Miller
*Attorney, Agent, or Firm*—Roger L. May; Joseph W. Malleck

[57] ABSTRACT

A method is provided for verifying the accuracy of a part geometry with respect to a master geometry. The method begins with the step of providing a computer workstation including a computer and an output device attached to the computer. The method also includes the steps of generating a master HDPDM describing the geometry of the master and generating a part HDPDM describing the geometry of the part. The master HDPDM includes a plurality of points. The method further includes the step of aligning the master HDPDM and the part HDPDM within a coordinate frame. The method continues with the step of computing the distance from each point of the master HDPDM to the surface described by the part HDPDM to obtain signed distance data. The method concludes with the step of displaying an image on the output device based on the signed distance data. The image represents the non-conformance between the master and the part and is used to verify the accuracy of the geometry of the part with respect to the geometry of the master.

18 Claims, 7 Drawing Sheets

METHOD AND SYSTEM FOR COMPARING FREE-FORM GEOMETRIES USING HIGH DENSITY POINT DATA MODELS

CROSS-REFERENCE TO RELATED APPLICATION

This application is a continuation-in-part of application Ser. Nos. 08/161,025, filed Dec. 3, 1993 now U.S. Pat. No. 5,319,567 and 07/980,419, filed Nov. 23, 1992 now U.S. Pat. No. 5,384,717. This application is also related to a commonly owned application entitled "Non-Contact Method and System For Building CAD Models By Integrated High Density Data Scans" now U.S. Pat. No. 5,414,647.

TECHNICAL FIELD

This invention relates generally to methods and systems for comparing free-form geometries. In particular, this invention relates to a computerized method and system for comparing the geometries of two objects using high density point data models ("HDPDM") and displaying the non-conformities between the objects.

BACKGROUND ART

Recently, manufacturing designs have increasingly incorporated parts having free-form or complex geometries. Although parts having such geometries often replace parts having simpler geometries, there is still a need to verify the accuracy of parts having complex geometries for both fit and function.

Evaluating the accuracy of manufactured parts with complex geometries is more difficult than inspection of their prismatic predecessors. The closest prior art consists of a group of related patents which disclose the use of computer-generated models related to fabricating objects having unique geometries, such as a dental prosthesis.

These patents include U.S. Pat. Nos. 5,257,203, 5,121,334 and 5,121,333 of Riley et al., 5,184,306 and 5,128,870 of Erdman et al., and 5,027,281 of Rekow et al. Each of the cited patents discloses steps involved with creating a computer model for use with a milling machine. None of the references, however, disclose methods for verifying conformance of the manufactured prosthesis to the computer model.

In view of the prior art and the trend toward parts having free-form geometries, a need exists for an efficient and accurate method for verifying conformance of a manufactured part to its design specifications.

DISCLOSURE OF THE INVENTION

The present invention described and disclosed herein comprises a method and system for verifying the accuracy of a geometry of a part with respect to the geometry of a master.

It is an object of the present invention to provide a method and system for verifying the accuracy of a part geometry with respect to a master geometry by outputting an image representing non-conformance between the part geometry and the master geometry.

It is another object of the present invention to provide a method and system for verifying the accuracy of a part geometry with respect to a master geometry by displaying an image based on signed distance data.

In carrying out the above objects and other objects of the present invention, a method is provided for verifying the accuracy of a part geometry with respect to a master geometry. The method of the present invention begins with the step of providing a computer workstation. The workstation includes a computer and an output device attached to the computer.

The method also includes the steps of generating a master HDPDM describing the geometry of the master and generating a part HDPDM describing the geometry of the part. The master HDPDM includes a plurality of points.

The method of the present invention further includes the step of aligning the master HDPDM and the part HDPDM within a coordinate frame. The method continues with the step of computing the distance from each point of the master HDPDM to the surface described by the part HDPDM to obtain signed distance data.

The method finally includes the step of displaying an image on the output device based on the signed distance data. The image represents the non-conformance between the master and the part. The image is used to verify the accuracy of the geometry of the part with respect to the geometry of the master.

In further carrying out the above objects and other objects of the present invention, a system is also provided for carrying out the steps of the above described method.

The objects, features and advantages of the present invention are readily apparent from the detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which reference characters indicate corresponding parts in all of the views, wherein.

BEST MODES FOR CARRYING OUT THE INVENTION

Figure 1A:
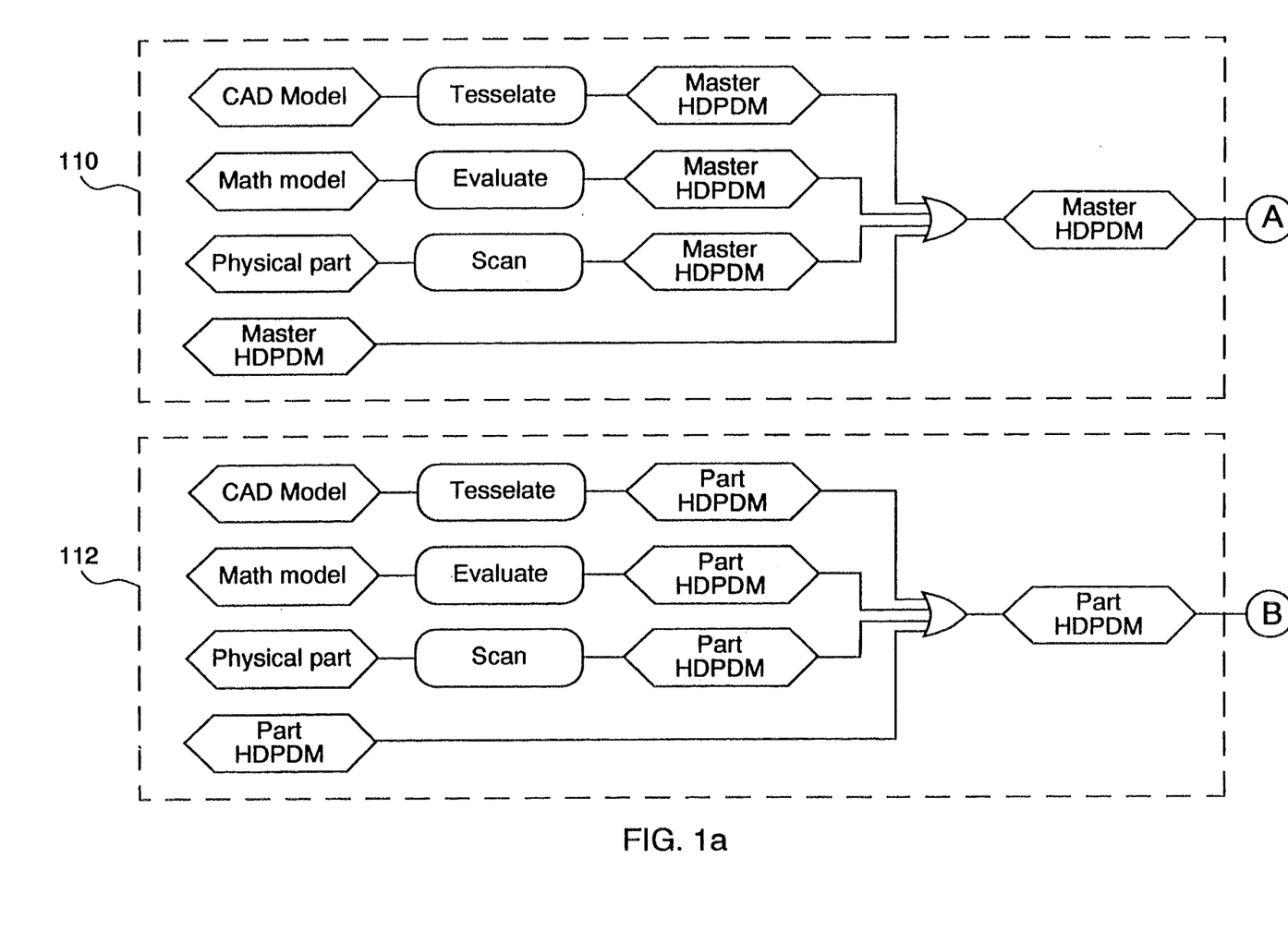
FIGS. 1a–1c are a process flow diagram illustrating the general procedure for inspecting free-form geometries in accordance with the present invention.
Figure 1B:
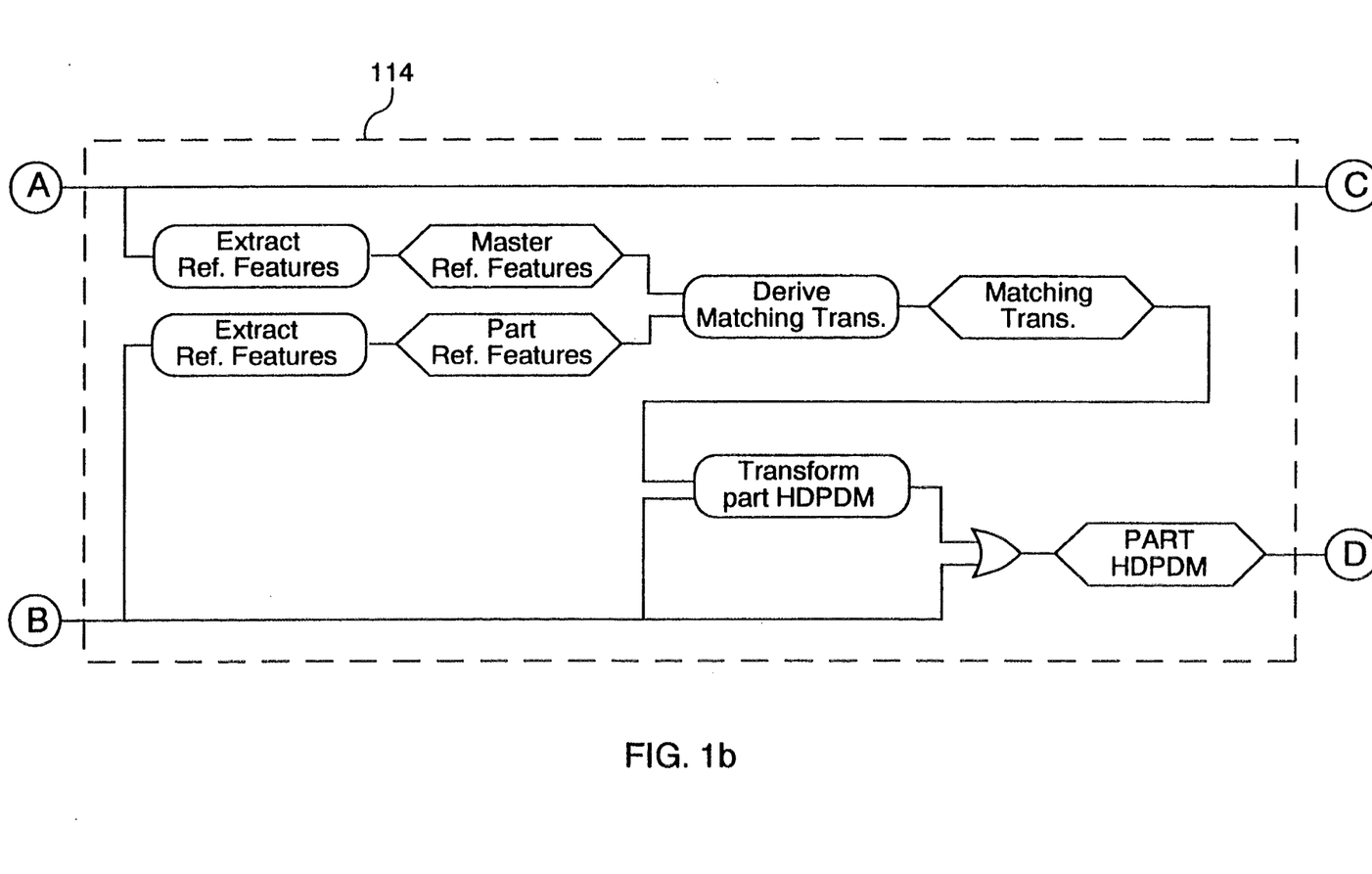
Figure 1C:
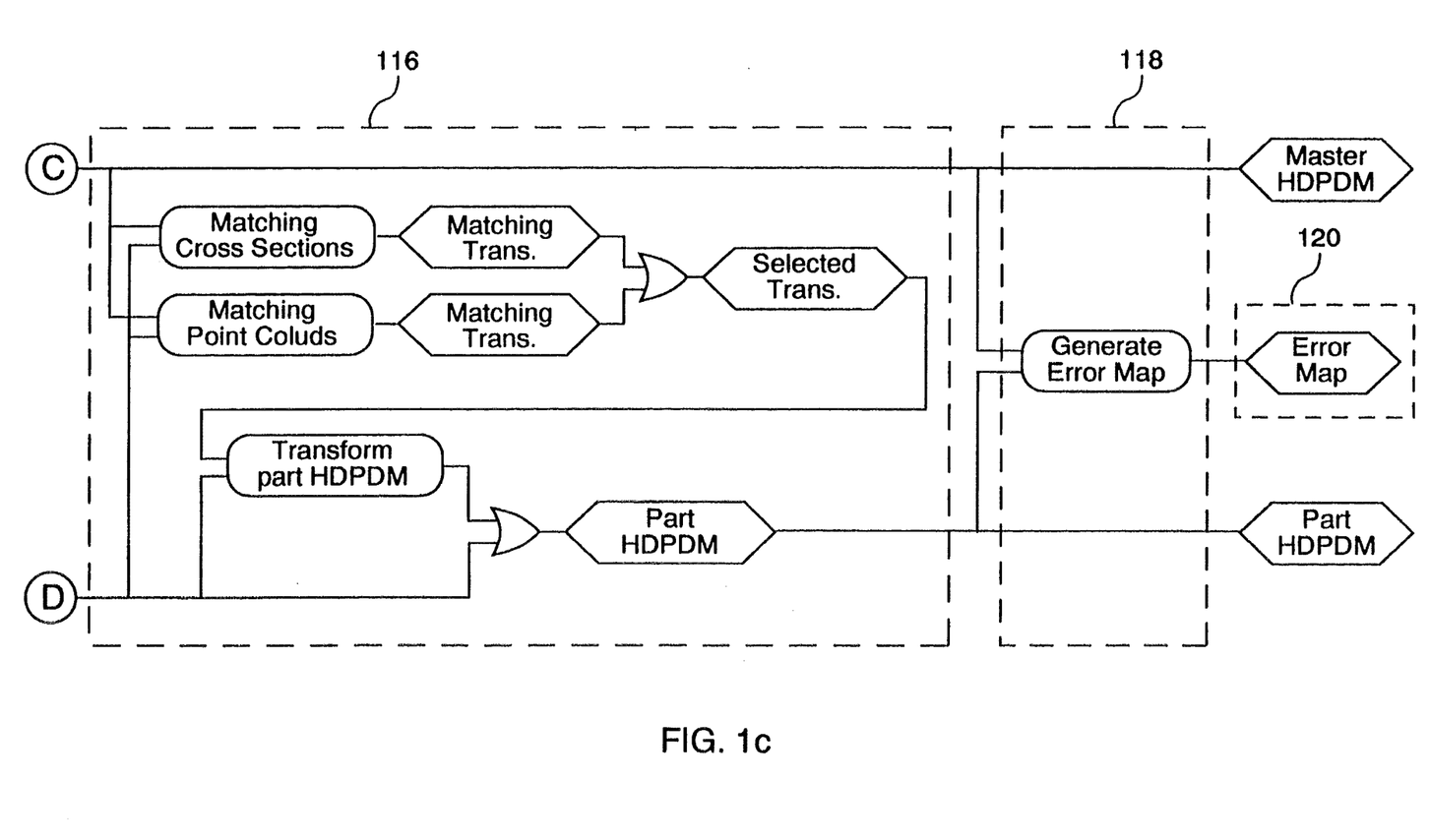

Referring now to the drawings, FIGS. 1a–1c illustrate the general procedure for inspecting free-form geometry in accordance with the present invention. As illustrated at block 110, the procedure begins with obtaining a master HDPDM. Several sources can be used to obtain the master HDPDM including CAD model, a math model, and a physical object.

If a CAD model is to be used as the master, it can be translated into a HDPDM by tessellating the CAD model using the tessellating routines that are part of most CAD packages. The vertices of the tessellations are then regrided to obtain the Master HDPDM.

If a Math Model is to be used as the master, it can be evaluated at discrete values of X and Y to obtain the Z values to obtain the master HDPDM.

If a physical object is to be used as the master, it can be obtained using a laser scanner. The physical object is scanned at various values of X and Y to obtain the Z values to obtain the master HDPDM.

As shown at block 112, the next step of the procedure is obtaining a Part HDPDM like obtaining the master HDPDM. This can be accomplished using a CAD model, a math model, a physical part or an existing part HDPDM.

The master HDPDM and part HDPDM must be registered very precisely in the same coordinate frame for proper comparison, otherwise misalignment errors will mask differences between the master and the part.

As shown by block 114, if the master and part contain reference features such as locating holes, planes or reference artifacts such as tooling balls, the precise location of these features can be extracted by the methods described in patent application Ser. Nos. 07/980,419 and 08/161,025. This information can be used to obtain the appropriate transformation to align the master and part precisely.

As shown by block 116, if the master and part contain no reference features then alignment can be obtained through a user procedure. Cross-sections of the point cloud data for constant x or constant y can be considered. By fixing x or y, a one dimensional curve is obtained. By visually comparing curves for both the master and the part, it is possible to determine a transformation to align the master and part. This process can be iterated until proper alignment is obtained.

Once the master HDPDM and part HDPDM are in proper alignment, it is possible to compute the distance from each point in the master HDPDM to the surface of the HDPDM part. This is illustrated by block 118.

Finally, as shown by block 120, a color map is used to display the signed distances between the two objects.

COMPUTING THE NORMAL DISTANCE BETWEEN A MASTER AND A PART

Figure 2:
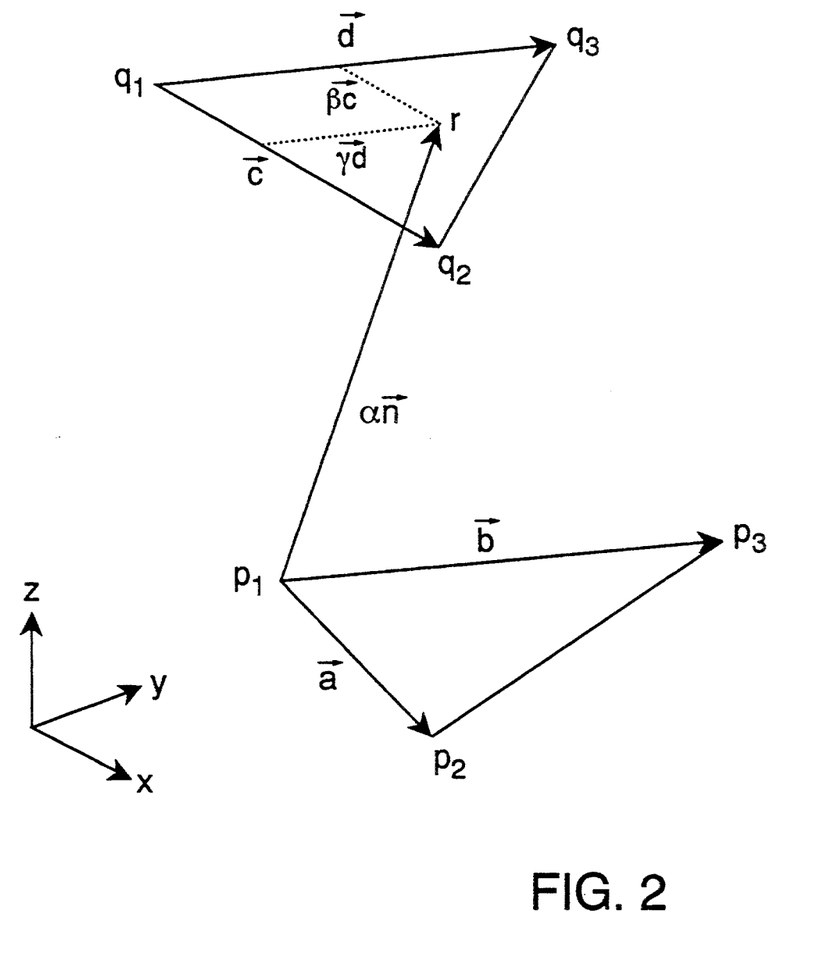
FIG. 2 is a vector diagram illustrating the distance between a point in a master HDPDM and the surface described by a part HDPDM.

Referring now to FIG. 2, a vector diagram is shown illustrating the distance between a point in a master HDPDM and the surface described by a part HDPDM.

Let $q_1$, $q_2$, $q_3$ represent three points which form a triangle in the scan of the physical part and $p_1$, $p_2$, $p_3$ represent three points which form a triangle in the master model. Then vectors a, b, c and d can be formed as follows:

$$\vec{a} = \vec{p_2} - \vec{p_1} \quad (1)$$

$$\vec{b} = \vec{p_3} - \vec{p_1} \quad (2)$$

$$\vec{c} = \vec{q_2} - \vec{q_1} \quad (3)$$

$$\vec{d} = \vec{q_3} - \vec{q_1} \quad (4)$$

A unit normal vector that is perpendicular to the plane of the triangle formed by a and b can be obtained by:

$$n = \frac{\vec{a} \times \vec{b}}{|\vec{a} \times \vec{b}|} \quad (5)$$

The point r can be obtained by piercing the plane defined by the points $q_1$, $q_2$, $q_3$. The point r can be calculated by going in the n direction from $p_1$ as follows:

$$\vec{r} = \vec{p_1} + a\vec{n} \quad (6)$$

where $a$ is the distance from $p_1$ to the pierce point r. The point r can also be represented as follows:

$$\vec{r} = \vec{q_1} + \beta\vec{c} + \gamma\vec{d} \quad (7)$$

By using equations 6 and 7, the following relationships for $\alpha$, $\beta$ and $\gamma$ can be identified:

$$a\vec{n} - \beta\vec{c} - \gamma\vec{d} = \vec{q_1} - \vec{p_1} \quad (8)$$

Provided n is neither parallel to nor contained in the plane defined by the points $q_1$, $q_2$, $q_3$, equation 8 can be solved uniquely for the unknowns $\alpha$, $\beta$ and $\gamma$.

If $$\beta \geq 0 \quad (9)$$

and $$\gamma \geq 0 \quad (10)$$

and $$\beta + \gamma \geq 1 \quad (11)$$

then $\alpha$ represents the distance between $p_1$ and the triangle defined by the points $q_1$, $q_2$, $q_3$.

This procedure can be repeated for all points in the master to obtain an error map of the normal distance between points on the master HDPDM and the surface of the part HDPDM.

A PRACTICAL APPLICATION

Figure 3:
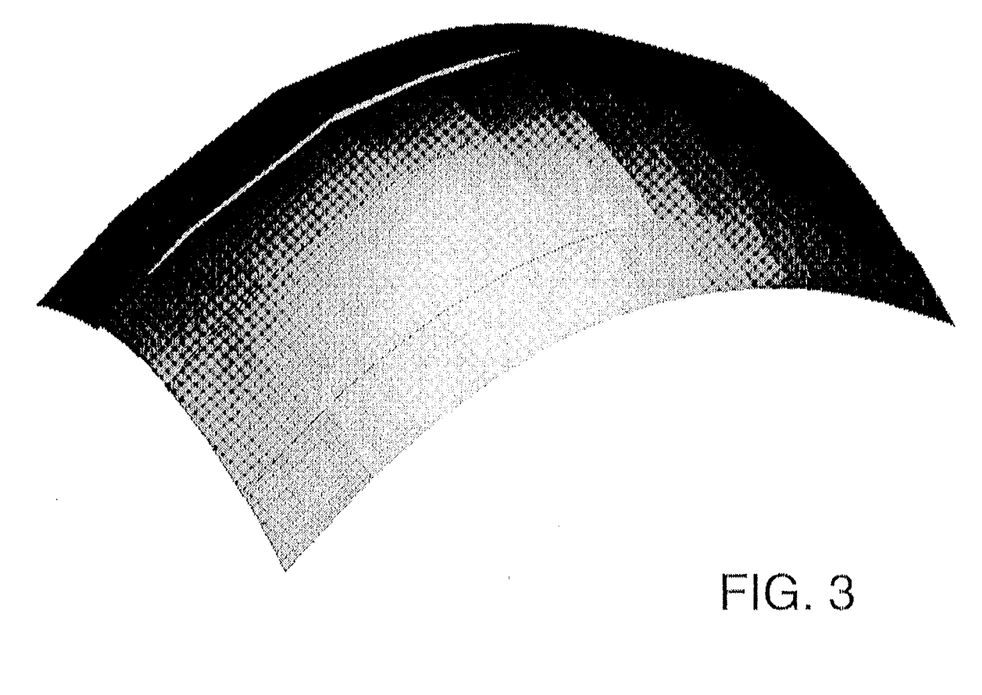
FIG. 3 is a master high density point data model for a headlamp reflector obtained using a math model.

A high density point data model was created from a math model of a headlamp reflector as can be seen in FIG. 3. A die was produced from this mathematical data by 5 axis nc machining.

Figure 4:
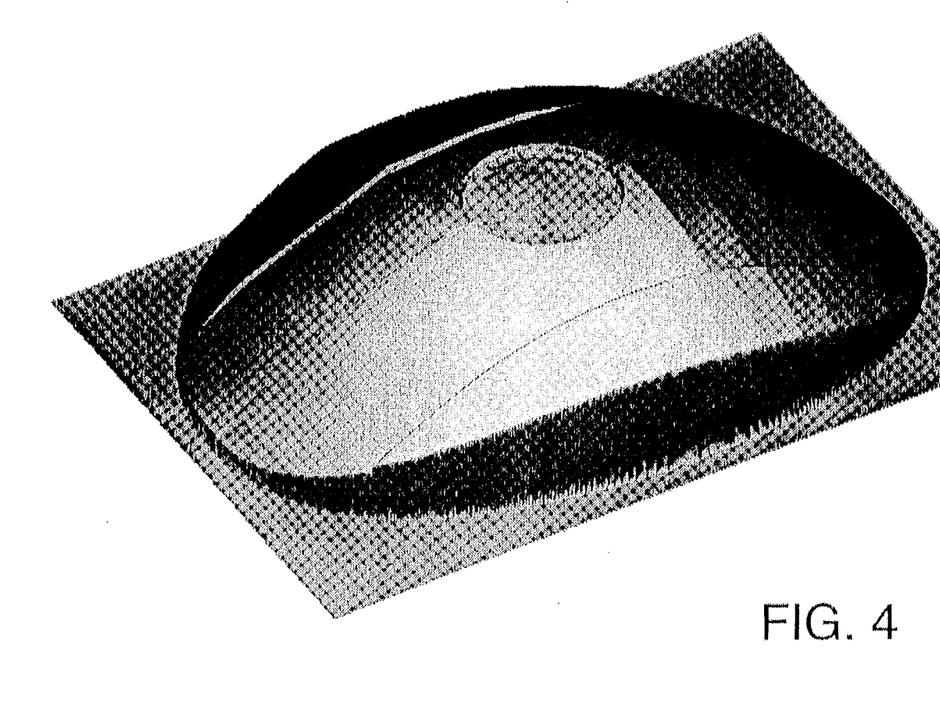
FIG. 4 is a part high density point data model for a headlamp reflector obtained through laser scanning.

FIG. 4 shows the high density point data model obtained by scanning the physical part. It was necessary to compare the die with the math model to make sure that the die accurately represented the math model.

Figure 5:
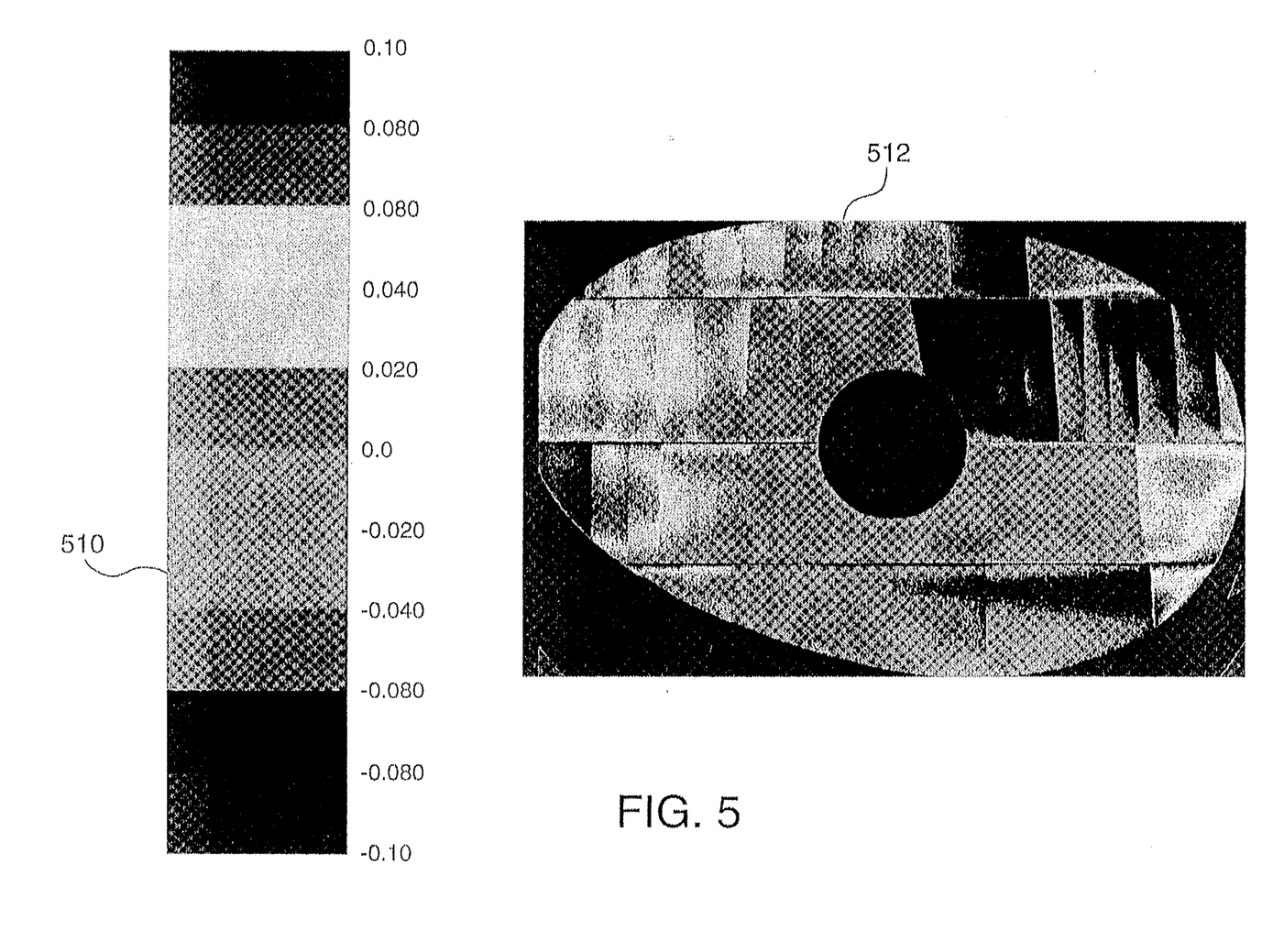
FIG. 5 is an error map displayed in accordance with the present invention.

FIG. 5 shows a coded error map of the distances developed using the method and system of the present invention to show the signed distance between the die (physical part) and the mathematical model (master). The error map includes a legend 510 and an image 512. Legend 510 represents a range which was selected with upper threshold 100 microns and lower threshold −100 microns. This interval is divided into 10 subintervals. Each subinterval was given a different gray scale. Distances greater than the maximum, in this case 100 microns, were set to the maximum. Similarly, distance values less than the minimum, in this case −100 microns, were set to the minimum.

Image 512 shows the distances between the math model for a headlamp reflector and the physical part. The shade of gray at the bottom of legend 510 appears in image 512 where the math model is 80 microns or more below the physical part, while the shade of gray at the top of legend 510 appears in image 512 where the math model is 80 microns or less above the physical part. The center of the picture is this shade of gray since the math model had no bulb. All distances are calculated along the normal on the math model.

While the best mode for carrying out the invention has been described in detail, those familiar with the art to which this invention relates will recognize various alternative designs and embodiments for practicing the invention as defined by the following claims.

We claim:

1. A method for verifying the accuracy of a geometry of a part with respect to the geometry of a master, the method comprising:

providing a computer workstation including a computer and an output device attached to the computer;

generating a master HDPDM having a plurality of points, the master HDPDM describing the geometry of the master;

scanning a surface of a part to generate scanned part converting the scanned part signals to corresponding electrical part signals;

generating a part HDPDM based on the electrical part signals, the part HDPDM having a plurality of points describing the geometry of the part;

aligning the master HDPDM and part HDPDM within a coordinate frame;

computing the distance from each point of the master HDPDM to the surface described by the part HDPDM to obtain signed distance data; and outputting an image on the output device based on the signed distance data, the image including a plurality of pixels representing the geometry of the master, each pixel being coded to indicate non-conformance between the master and the part based on the step computing to verify the accuracy of the geometry of the part with respect to the geometry of the master.

2. The method of claim 1 wherein the step of generating the master HDPDM includes:

tessellating a CAD model to produce tesselated object data; and regriding the tesselated object data to obtain the master HDPDM.

3. The method of claim 1 wherein the step of generating a part HDPDM includes:

tessellating a CAD model to produce tesselated object data; and regriding the tesselated object data to obtain the part HDPDM.

4. The method of claim 1 wherein the step of generating the master HDPDM includes:

selecting discrete values along a first and second mutually exclusive orthogonal axis; and calculating discrete values along a third mutually exclusive orthogonal axis based on a master math model to obtain the master HDPDM.

5. The method of claim 1 wherein the step of generating the part HDPDM includes:

selecting discrete values along a first and second mutually exclusive orthogonal axis; and calculating discrete values along a third mutually exclusive orthogonal axis based on a part math model to obtain the part HDPDM.

6. The method of claim 1 wherein the step of generating the master HDPDM includes:

scanning the master at discrete values of X and Y to obtain scan data; and processing the scan data to obtain the master HDPDM.

7. The method of claim 1 wherein the step of generating the part HDPDM includes:

scanning the part at discrete values of X and Y to obtain scan data; and processing the scan data to obtain the part HDPDM.

8. The method of claim 1 wherein the step of aligning includes:

providing a first set of reference data identifying reference features of the first object;

providing a second set of reference data identifying reference features of the second object;

computing a transformation equation based on the first and second sets of reference data; and updating the part HDPDM based on the transformation equation, wherein the updated part HDPDM is utilized in the step of computing the distance.

9. The method of claim 1 wherein the step of displaying includes:

selecting a plurality of ranges of non-conformity based on the signed distance data;

selecting a plurality of colors to be associated with the plurality of ranges; and displaying an image using the plurality of colors, each color indicating non-conformity between the first and second objects within its associated range.

10. A system for verifying the accuracy of a geometry of a part with respect to the geometry of a master, the system comprising:

a computer workstation including a computer and an output device attached to the computer;

means for generating a master HDPDM having a plurality of points, the master HDPDM describing the geometry of the master;

means for scanning a surface of a part to generate scanned part signals;

means for converting the scanned part signals to corresponding electrical part signals;

means for generating a part HDPDM based on the electrical part signals, the part HDPDM having a plurality of points describing the geometry of the part;

means for aligning the master HDPDM and part HDPDM within a coordinate frame;

means for computing the distance from each point of the master HDPDM to the surface described by the part HDPDM to obtain signed distance data; and means for outputting an image on the output device based on the signed distance data, the image including a plurality of pixels representing the geometry of the master, each pixel being coded to indicate non-conformance between the master and the part to verify the accuracy of the geometry of the part with respect to the geometry of the master.

11. The system of claim 10 wherein the means for generating the master HDPDM includes:

means for tessellating a CAD model to produce tesselated object data; and means for regriding the tesselated object data to obtain the master HDPDH.

12. The system of claim 10 wherein the means for generating a part HDPDH includes:

means for tessellating a CAD model to produce tesselated object data; and means for regriding the tesselated object data to obtain the part HDPDM.

13. The system of claim 10 wherein the means for generating the master HDPDM includes:

means for selecting discrete values along a first and second mutually exclusive orthogonal axis; and means for calculating discrete values along a third mutually exclusive orthogonal axis based on a master math model to obtain the master HDPDM.

14. The system of claim 10 wherein the means for generating the part HDPDM includes:

means for selecting discrete values along a first and second mutually exclusive orthogonal axis; and means for calculating discrete values along a third mutually exclusive orthogonal axis based on a part math model to obtain the part HDPDM.

15. The system of claim 10 wherein the means for generating the master HDPDM includes:

means for scanning the master at discrete values of X and Y to obtain scan data; and means for processing the scan data to obtain the master HDPDM.

16. The system of claim 10 wherein the means for generating the part HDPDM includes:

means for scanning the part at discrete values of X and Y to obtain scan data; and means for processing the scan data to obtain the part HDPDM.

17. The system of claim 10 wherein the means for aligning includes:

means for providing a first set of reference data identifying reference features of the first object;

means for providing a second set of reference data identifying reference features of the second object;

means for computing a transformation equation based on the first and second sets of reference data; and means for updating the part HDPDM based on the transformation equation, wherein the updated part HDPDM is utilised in the step of computing the distance.

18. The system of claim 10 wherein the means for displaying includes:

means for selecting a plurality of ranges of non-conformity based on the signed distance data;

means for selecting a plurality of colors to be associated with the plurality of ranges; and means for displaying an image using the plurality of colors, each color indicating non-conformity between the first and second objects within its associated range.

* * * * *